US006907439B1

(12) United States Patent
Wicker

(10) Patent No.: US 6,907,439 B1
(45) Date of Patent: *Jun. 14, 2005

(54) FFT ADDRESS GENERATION METHOD AND APPARATUS

(75) Inventor: David J. Wicker, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 619 days.

This patent is subject to a terminal disclaimer.

(21) Appl. No.: 10/106,509

(22) Filed: Mar. 26, 2002

Related U.S. Application Data

(60) Provisional application No. 60/358,116, filed on Feb. 20, 2002.

(51) Int. Cl.[7] .............................................. G06F 15/00
(52) U.S. Cl. ...................................................... 708/404
(58) Field of Search ................................ 708/400, 403, 708/404, 405, 406, 408, 409

(56) References Cited

U.S. PATENT DOCUMENTS

| 4,393,457 A | 7/1983 | New |
| 4,689,762 A | 8/1987 | Thibodeau, Jr. et al. |
| 5,430,667 A | 7/1995 | Takano |
| 5,473,556 A | * 12/1995 | Aguilar et al. .............. 708/404 |
| 5,491,652 A | 2/1996 | Luo et al. |
| 5,991,788 A | 11/1999 | Mintzer |
| 6,035,313 A | * 3/2000 | Marchant .................... 708/404 |

* cited by examiner

*Primary Examiner*—Chuong Dinh Ngo

(57) ABSTRACT

A method and apparatus are used to generate FFT data addresses based upon a computation stage value and a computation step value within that computation stage. The method includes the steps of generating a first data address by insertion at a bit insertion position a first bit between existing bits of a binary word and generating a second data address by inserting at the bit insertion position a second bit between existing bits of the binary word, wherein the binary word represents the computation step value. The apparatus includes a series of consecutive bit cells that generate the desired data addresses based upon a decoded value of the computation stage.

33 Claims, 10 Drawing Sheets

| Stage | 2^stage | Step | Step (Binary) | Address(Binary) | "A" address | "B" address |
|---|---|---|---|---|---|---|
| 0 | 1 | 0 | 0000 | 000X | 0 | 1 |
| 0 | 1 | 1 | 0001 | 001X | 2 | 3 |
| 0 | 1 | 2 | 0010 | 010X | 4 | 5 |
| 0 | 1 | 3 | 0011 | 011X | 6 | 7 |
| 0 | 1 | 4 | 0100 | 100X | 8 | 9 |
| 0 | 1 | 5 | 0101 | 101X | 10 | 11 |
| 0 | 1 | 6 | 0110 | 110X | 12 | 13 |
| 0 | 1 | 7 | 0111 | 111X | 14 | 15 |
| 1 | 2 | 0 | 0000 | 00X0 | 0 | 2 |
| 1 | 2 | 1 | 0001 | 00X1 | 1 | 3 |
| 1 | 2 | 2 | 0010 | 01X0 | 4 | 6 |
| 1 | 2 | 3 | 0011 | 01X1 | 5 | 7 |
| 1 | 2 | 4 | 0100 | 10X0 | 8 | 10 |
| 1 | 2 | 5 | 0101 | 10X1 | 9 | 11 |
| 1 | 2 | 6 | 0110 | 11X0 | 12 | 14 |
| 1 | 2 | 7 | 0111 | 11X1 | 13 | 15 |
| 2 | 4 | 0 | 0000 | 0X00 | 0 | 4 |
| 2 | 4 | 1 | 0001 | 0X01 | 1 | 5 |
| 2 | 4 | 2 | 0010 | 0X10 | 2 | 6 |
| 2 | 4 | 3 | 0011 | 0X11 | 3 | 7 |
| 2 | 4 | 4 | 0100 | 1X00 | 8 | 12 |
| 2 | 4 | 5 | 0101 | 1X01 | 9 | 13 |
| 2 | 4 | 6 | 0110 | 1X10 | 10 | 14 |
| 2 | 4 | 7 | 0111 | 1X11 | 11 | 15 |
| 3 | 8 | 0 | 0000 | X000 | 0 | 8 |
| 3 | 8 | 1 | 0001 | X001 | 1 | 9 |
| 3 | 8 | 2 | 0010 | X010 | 2 | 10 |
| 3 | 8 | 3 | 0011 | X011 | 3 | 11 |
| 3 | 8 | 4 | 0100 | X100 | 4 | 12 |
| 3 | 8 | 5 | 0101 | X101 | 5 | 13 |
| 3 | 8 | 6 | 0110 | X110 | 6 | 14 |
| 3 | 8 | 7 | 0111 | X111 | 7 | 15 |

Fig. 2

FFT ADDRESS GENERATION METHOD AND APPARATUS

This application claims priority to U.S. Provisional Patent Application SC/Ser. No. 60/358,116, filed Feb. 20, 2002, entitled "FFT Address Generation Method and Apparatus."

BACKGROUND OF THE INVENTION

1. Field of the Invention

The present invention relates to a Fast Fourier Transform (FT) address generator, and more particularly to an FFT address generator that can generate addresses for a broad range of FFT sizes and can support hardware parallelism.

2. Description of the Related Art

The Discrete Fourier Transform (DFT) is the decomposition of a sampled signal in terms of sinusoidal components. If the signal is a function of time, such decomposition results in a frequency domain signal. The DFT is a fundamental digital signal processing algorithm used in many applications, including frequency domain processing and frequency analysis.

Because of its computational requirements, the DFT algorithm is usually not used for real time signal processing. Research has developed more efficient ways to compute the DFT by exploiting its symmetry and periodicity properties in order to significantly lower its computational requirements. The resulting algorithms are known collectively as Fast Fourier Transforms (FFTs). The FFT algorithm is based on the decomposition of the DFT computation. There are two decomposition approaches: decimation-in-time (DIT) and decimation-in-frequency (DIF).

The FFT is one of the most important algorithms in digital signal processing (DSP) applications. An FFT processor system mainly consists of two parts: the butterfly processor for arithmetic operation and an address generator for the generation of read/write addresses. The address generator provides addresses for the operation data for each butterfly calculation. As is known, the FFT butterfly computation operates on data in sets of r points, where r is called the radix. A P-point FFT uses P/r computation steps per computation stage for $log_r P$ stages. Each computation step requires two data values out of the set of data points. The computational result of one butterfly stage is the input data of the next butterfly stage.

SUMMARY

In accordance with the present invention, a method and apparatus is provided to perform FFT addressing for a broad range of address FFT sizes and to support hardware parallelism. The FFT addressing scheme is ideally suited for, but not limited to, field programmable gate array (FPGA) implementations that require efficient address generation over a broad range of FFT sizes.

In accordance with the present invention, given the stage and step values, the desired FFT data addresses can be generated by insertion of a single bit independent of how the stage and step values were arrived at. This allows the FFT to be executed in any order desired, allowing parallelism to be exploited in hardware by executing the butterfly computations in parallel by specifying the desired step and stage.

The method in accordance with the present invention generates data addresses based upon a computation stage value and a computation step value within that computation stage. The method includes the steps of generating a first data address by inserting at a bit insertion position a first bit between existing bits of a binary word and generating a second data address by inserting at the bit insertion position a second bit between existing bits of the binary word, wherein the binary word represents the computation step value.

One implementation of an apparatus to calculate addresses using the method described includes a series of consecutive bit cells that generate the desired data addresses based upon a decoded value of the computation stage. Each bit cell includes as inputs one bit of the current computation stage value ($stage_n$), one bit of the current computation step value from a previous consecutive bit cell ($stage_{n-1}$), and an insertion bit. Each bit cell further includes a means for providing as an output, based upon a decoded value of the computation stage, either the bit of the current computation stage value ($stage_n$), the bit of the current computation step value from a previous consecutive bit cell ($stage_{n-1}$), or the insertion bit.

BRIEF DESCRIPTION OF THE DRAWINGS

Details of the present invention will appear more clearly from the following description in which the preferred embodiment of the invention has been set forth in conjunction with the drawings in which:

FIG. 2 depicts a table describing a method in accordance with the present invention;

DETAILED DESCRIPTION

Figure 1A:
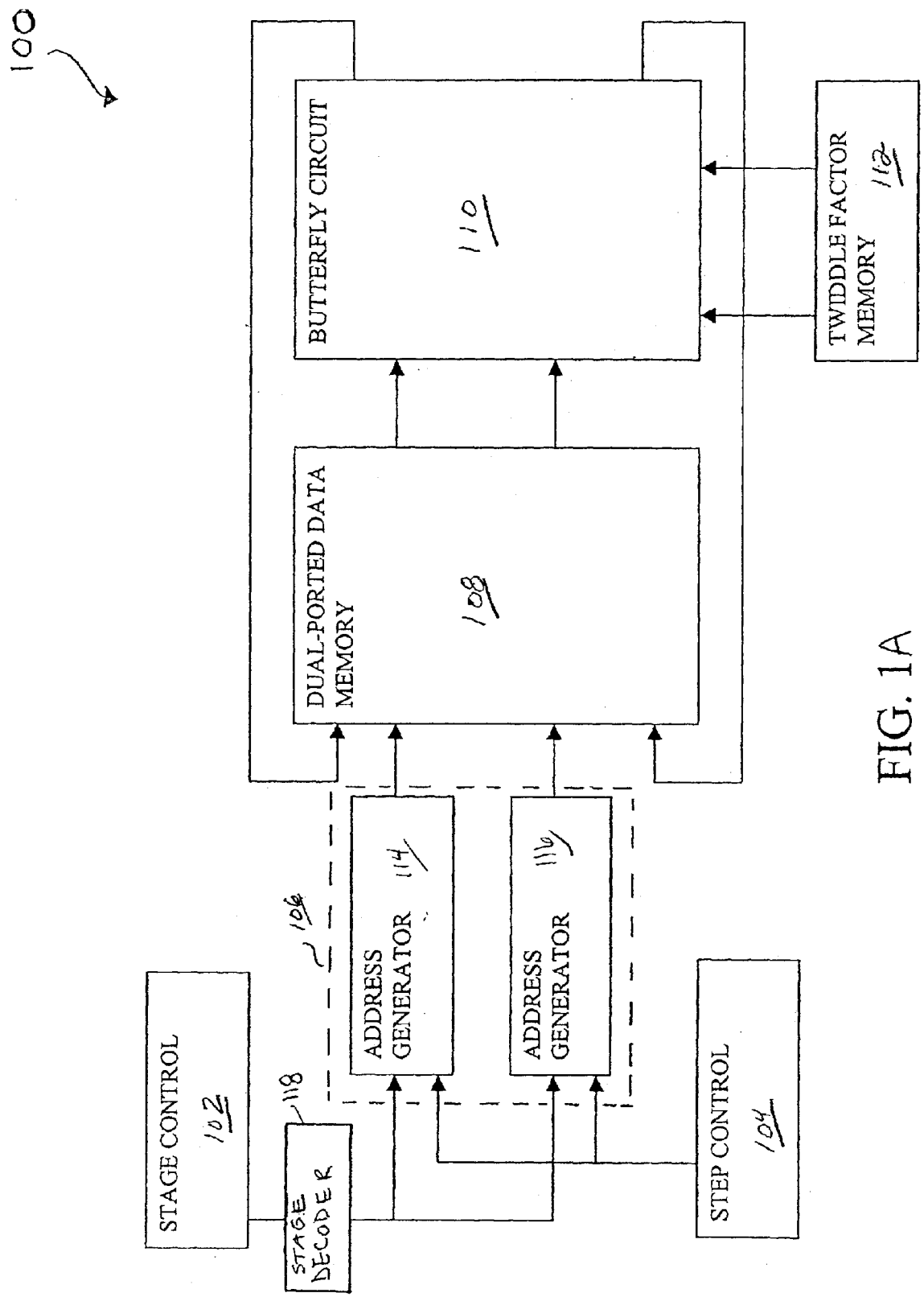
FIG. 1A is a block diagram depicting an FFT circuit utilizing an address generator in accordance with the present invention.

FIG. 1A is a block diagram depicting an FFT circuit 100 utilizing an address generator 106 in accordance with the present invention. Address generator 106 comprises two address generator units 114 and 116. As explained in more detail below, each address generator unit 114 and 116 generates a data address based upon binary information received from stage control 102 through stage decoder 118, and binary information received from step control 104. In one embodiment, stage control 102 and step control 104 are programmable counters, which allow a user to program the increment size and sequence. The programmable counters can be adders and registers that allow a count value to be incremented or decremented by any desired value. Each data address is then transmitted to a dual-ported memory 108. In this manner, address generator 106 generates two data addresses in parallel such that the butterfly circuit 110 can obtain two data points simultaneously. FFT circuit 100 further comprises twiddle factor memory 112. Twiddle factor memory 112 supplies coefficients to the butterfly circuit 110, which are used by butterfly circuit 110 to perform the FFT computation.

Figure 1B:
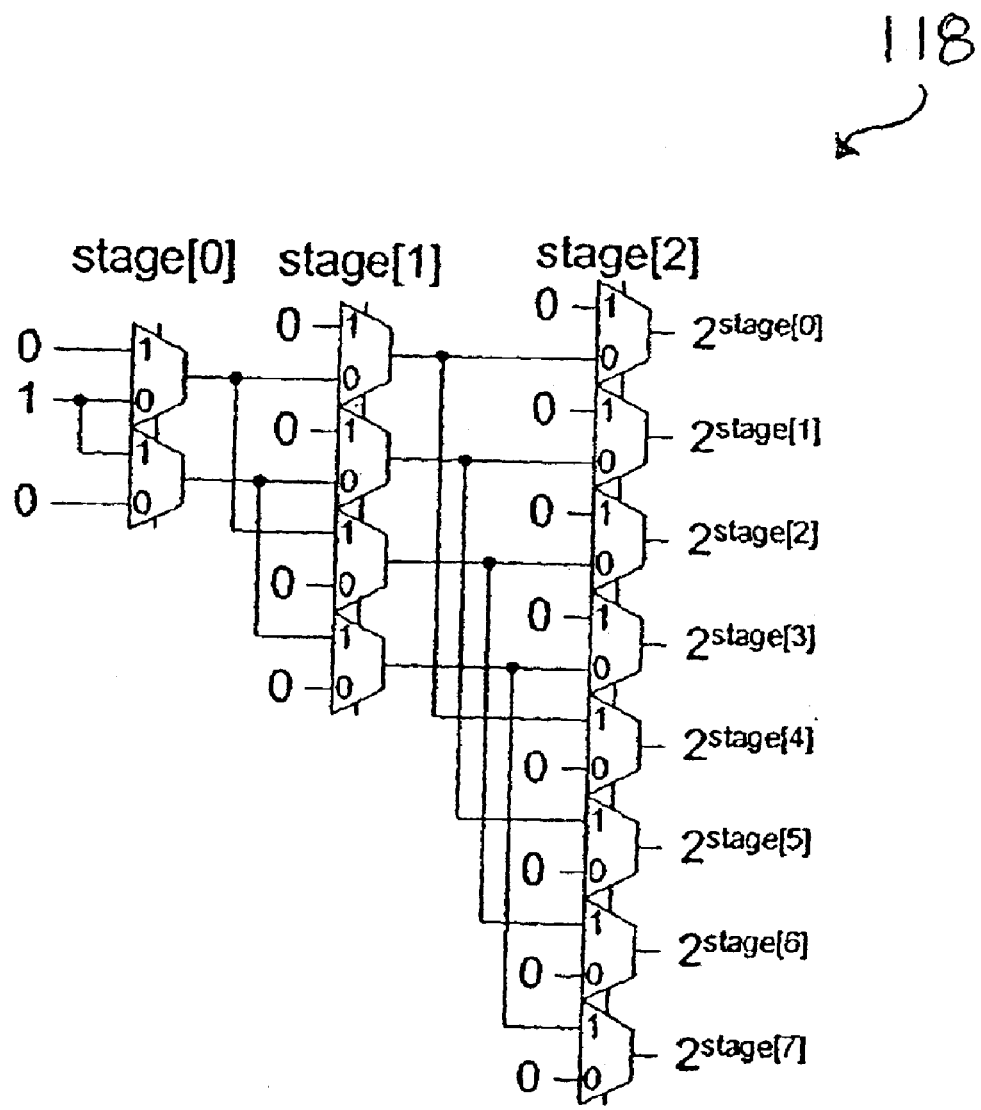
FIG. 1B is a block diagram depicting a stage decoder in accordance with the present invention.

FIG. 1B is a block diagram depicting one embodiment of stage decoder 118 of FFT circuit 100 in accordance with the present invention. As will be explained in more detail below, stage decoder 118 provides address generator 106 with a decoded value of the current FFT stage received from stage control 102. This decoded value comprises the binary value of $2^{stage}$, wherein "stage" equals the current FFT stage value. In one embodiment, stage decoder 118 comprises a series of multiplexers which perform this mathematical operation $2^{stage}$. The inputs and outputs of the various multiplexers are shown in FIG. 1B. The multiplexers also receive as input select signals one bit stage[0], stage[1] or stage[2] of the current FFT stage value. For example, for stage 1, bit stage[0] equals 1, bit stage[1] equals 0, and bit stage[2] equals 0. Stage decoder 118 generates a binary value $2^{stage}$ for an 8-bit address generation circuit, and can be modified for any desired address size.

FIG. 2 depicts a table describing a method for generating FFT data addresses in accordance with the present invention in context of a 16 point radix-2 DIT or DIF FFT. The method in accordance with the present invention can be applied to generate addresses for any-point FFT.

As shown in FIG. 2, the 16-point FFT has four butterfly stages ($stage_0$–$stage_3$) and each stage includes eight computation steps ($step_0$ –$step_7$). Each step value is also represented as a binary word ($s_3$ $s_2$ $s_1$ $s_0$).

The method of generating data addresses based upon a computation stage value and a corresponding computation step value is depicted in FIG. 2 as follows. A first data address ("A" address) is generated by inserting a "0" into the binary step value. A second data address ("B" address) is generated by inserting a "1" into the binary step value. The bit insertion position is determined by the current stage value.

For example, with reference to FIG. 2, the "A" address and the "B" address for $stage_0$, $step_1$ are generated as follows. A bit insertion position is determined from the stage value. For $stage_0$ the bit insertion position in the binary word of the step value is the $s_0$ bit position as illustrated by the X in the binary address. Therefore, the "A" address is generated by inserting a "0" into the step, word (0001) at the $s_0$ bit position. The upper bits are shifted to the left. The resulting "A" address is thus 0010. Likewise, the "B" address is generated by inserting a "1"into the $step_1$ word (0001) at the $s_0$ bit position. The upper bits are shifted to the left, and the resulting "B" address is 0011.

As a further example, the "A" address and the "B" address for $stage_1$, $step_2$ are generated as follows. A bit insertion position is determined from the stage value $stage_1$ to be the $s_1$ bit position. The "A" address is generated by inserting a "0" into the $step_2$ word (0010) at the $s_1$ bit position. The upper bits are shifted to the left. The resulting "A" address is thus 0100. Likewise, the "B" address is generated by inserting a "1" into the $step_2$ word (0010) at the $s_1$ bit position. The upper bits are shifted to the left, and the resulting "B" address is 0110.

The value of the computation stage is decoded by computing $2^{stage}$ and representing the result as a binary word. Thus, for example, the decoded value for $stage_1$ is equal to $2^1$, which is represented in binary form as 0010. This decoded stage value will be described in connection with the embodiments shown in FIGS. 3–13.

Figure 3:
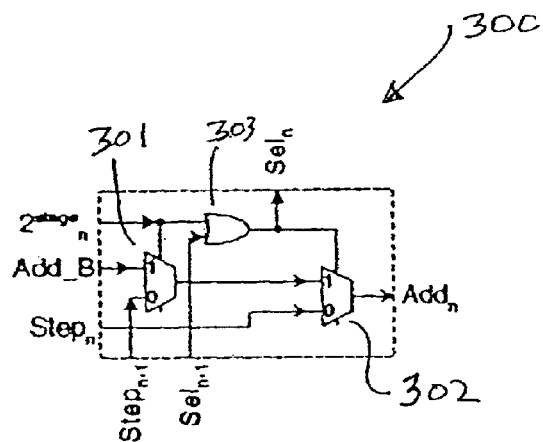
FIG. 3 is a block diagram depicting a bit cell in accordance with the present invention.

FIG. 3 is a block diagram depicting one embodiment of the bit cell 300 used in an apparatus for generating addresses in accordance with the present invention. Bit cell 300 is composed of multiplexers (301, 302) and an OR gate (303). Multiplexer 301 receives input select signal $2^{stage}_n$ and inputs Add_B and $Step_{n-1}$. OR gate 303 receives as inputs $2^{stage}_n$, and $Sel_{n-1}$. The output of OR gate 303 is supplied as an input select signal to multiplexer 302. Multiplexer 302 also receives as inputs $Step_n$ and the output of multiplexer 301.

The inputs to bit cell 300 are further described as follows. Add_B is the address insertion bit. $2^{stage}_n$ represents one bit of the decoded value of the computation stage. Step, represents one current bit of the computation step value. $Step_{n-1}$ represents a previous bit of the computation step value. For example, if the $Step_n$ bit is the $s_1$ bit, the $Step_{n-1}$ bit is the $s_0$ bit. Lastly, $Sel_{n-1}$ is provided to the bit cell 300 from another consecutive bit cell.

Bit cell 300 provides as outputs $Add_n$ and $Sel_n$. $Add_n$ is the address bit generated by bit cell 300. $Sel_n$ is the output of OR gate 303 and is provided to another consecutive bit cell.

Figure 4:
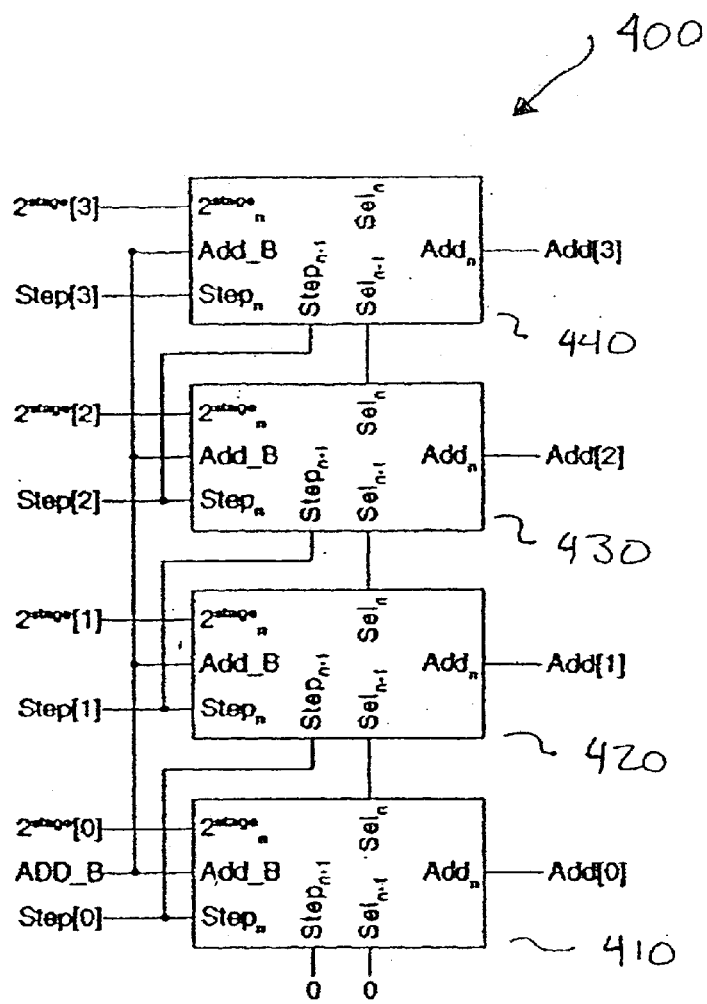
FIG. 4 is a block diagram depicting an address generator in accordance with the present invention.

FIG. 4 is a block diagram depicting an address generator in accordance with the present invention using the bit cell of FIG. 3. The address generator 400 in FIG. 4 depicts four consecutive bit cells (410–440), with each bit cell corresponding to one address bit. With four consecutive bit cells, an address with a word length of four bits can be generated. More or fewer bit cells can be used to generate addresses of varying lengths.

Each bit cell shown in FIG. 4 produces as an output an address bit consisting of one of three inputs. The three inputs that are chosen from include the $Step_n$ bit, the address insertion bit Add_B, and the $Step_{n-1}$ bit. Each bit cell chooses which input to provide as an output based upon the decoded value of the stage. The decoded value of the stage is the $2^{stage}$ input. Each bit cell also provides as an output a $Sel_{n-1}$ input to the next consecutive bit cell.

As a result, the method set forth in FIG. 2 is accomplished by each bit cell shown in FIG. 3 selecting, based upon the decoded value of the stage, whether to generate an output address bit corresponding to the current step bit ($Step_n$), an inserted bit (Add_B), or a previously skipped bit ($Step_{n-1}$).

Figure 5:
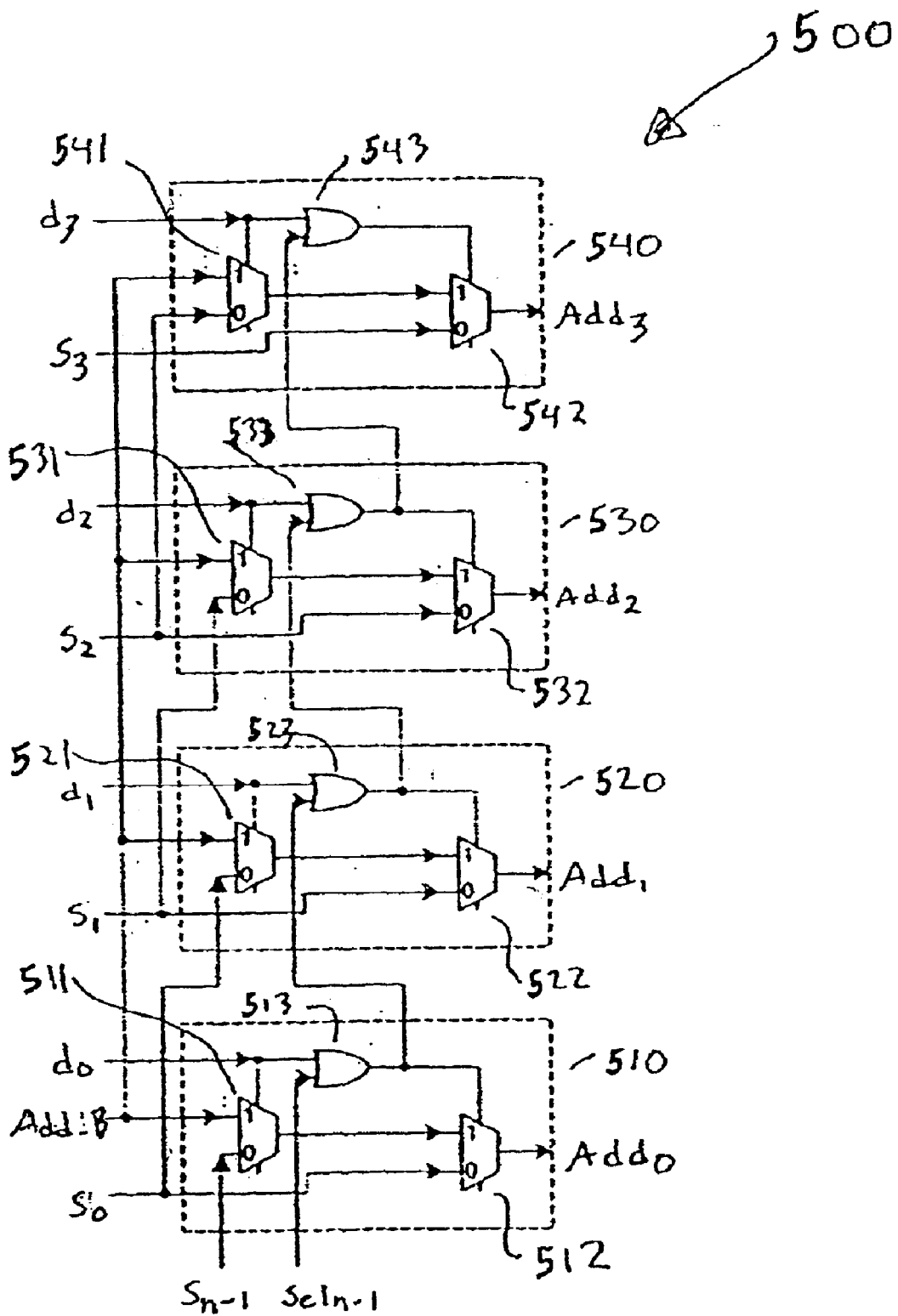
FIG. 5 is a block diagram depicting details of an address generator in accordance with the present invention.

FIG. 5 is a block diagram showing details of the circuitry for which one implementation is shown in the block diagram of FIG. 4. FIG. 5 depicts address generator 500, comprising four consecutive bit cells (510–540), with each bit cell corresponding to one address bit.

As an illustration, the operation of address generator 500 will be discussed in the context of generating an "A" address and a "B" address for $stage_1$, $step_1$. As discussed above, each bit cell 510–540 produces as an output one of three inputs, based upon the decoded value of the stage. Specifically, each bit cell produces as an output $Step_n$, Add_B or $Step_{n-1}$. The decoded value of the stage is determined by representing $2^{stage}$ in binary form. Thus, for stage$_1$, the decoded value of the stage is represented as 0010 ($d_3$ $d_2$ $d_1$ $d_0$).

With reference to bit cell 510, multiplexer 511 receives as inputs bit Add_B and bit Step$_{n-1}$(s$_{n-1}$). In the example of FIG. 3, bit s$_{n-1}$ is set at "0" for bit cell 510. The input select line for multiplexer 511 provides the bit corresponding to the decoded stage value (d$_0$) which equals "0" for stage$_1$. Thus, multiplexer 511 would select as an output bit s$_{n-1}$.

Multiplexer 512 of bit cell 510 receives as inputs the output of multiplexer 511 and bit Step$_n$(s$_0$). The output of OR gate 513 is supplied as the input select line for multiplexer 512. OR gate 513 receives as inputs bit d$_0$ and bit Sel$_{n-1}$. In the example of FIG. 4, bit Sel$_{n-1}$, is set at "0" for bit cell 510. Thus, OR gate 513 provides "0" as an output, and multiplexer 512 selects s$_0$ as an output. Accordingly, bit cell 510 provides s$_0$ as its output address bit Add$_0$.

It should be noted that the various logic gates depicted in the accompanying figures can be replaced with equivalent logic gates that produce the same logical results as the gates shown in the figures.

With reference to bit cell 520, multiplexer 521 receives as inputs bit Add_B and bit Step$_{n-1}$(s$_0$). The input select line for multiplexer 521 provides the bit corresponding to the decoded stage value (d$_1$), which equals "1" for stage$_1$. Thus, multiplexer 521 provides as an output insertion bit Add_B.

Multiplexer 522 of bit cell 520 receives as inputs the output of multiplexer 521 and bit Step$_n$(S$_1$). The output of OR gate 523 is supplied as the input select line for multiplexer 522. OR gate 523 receives as inputs bit d$_1$ and bit Sel$_{n-1}$. Bit Sel$_{n-1}$ is the output of OR gate 513 from bit cell 510. Thus, OR gate 523 provides "1" as an output, and multiplexer 522 selects as an output Add_B. Accordingly, bit cell 520 provides the insertion bit Add_B as its output address bit Add$_1$. As described in connection with FIG. 2, the insertion bit Add_B is set at "0" for the "A" address and "1" for the "B" address.

With reference to bit cell 530, multiplexer 531 receives as inputs bit Add_B and bit Step$_{n-1}$(s$_1$). The input select line for multiplexer 531 provides the bit corresponding to the decoded stage value (d$_2$), which equals "0" for stage$_1$. Thus, multiplexer 531 provides as an output bit s$_1$.

Multiplexer 532 of bit cell 530 receives as inputs the output of multiplexer 531 and bit Step$_n$ (S$_2$). The output of OR gate 533 is supplied as the input select line for multiplexer 532. OR gate 533 receives as inputs bit d$_2$ and bit Sel$_{n-1}$. Bit Sel$_{n-1}$ is the output of OR gate 523 from bit cell 520, which in this case equals "1". Thus, OR gate 533 provides "1" as an output, and multiplexer 532 selects as an output bit s$_1$. Accordingly, bit cell 530 provides bit s$_1$ as its output address bit Add$_2$. Bit s$_1$ was skipped as an output by previous bit cell 520, because bit cell 520 instead provided as an output the insertion bit Add_B.

Lastly, with reference to bit cell 540, multiplexer 541 receives as inputs bit Add_B and bit Step$_{n-1}$(s$_2$). The input select line for multiplexer 541 provides the bit corresponding to the decoded stage value (d$_3$), which equals "0" for stage$_1$. Thus, multiplexer 541 provides as an output bit S$_2$.

Multiplexer 542 of bit cell 540 receives as inputs the output of multiplexer 541 and bit Step$_n$ (S$_2$). The output of OR gate 543 is supplied as the input select line for multiplexer 542. OR gate 543 receives as inputs bit d$_3$ and bit Sel$_{n-1}$. Bit Sel$_{n-1}$ is the output of OR gate 533 from bit cell 530, which in this case equals "1". Thus, OR gate 543 provides "1" as an output, and multiplexer 542 selects as an output bit s$_2$. Accordingly, bit cell 540 provides bit S$_2$ as its output address bit Add$_3$. Bit S$_2$ was skipped as an output by previous bit cell 530, because bit cell 530 instead provided as an output bit s$_1$.

Thus, the address generator 500 executes the method set forth in FIG. 3 by generating a first "A" data address by inserting a "0" between existing bits of a computation step value at a bit insertion position, or by generating a second "B" data address by inserting a "1" between existing bits of a computation step value at a bit insertion position. The bit insertion position is determined by the decoded value of the computation stage value.

Address generator 500 can operate to generate only the "A" data address or only the "B" data address. Thus, two address generators can work in parallel to simultaneously generate both "A" and "B" addresses, as shown in FIG. 1. With such a configuration, a first address generator would have its Add_B input always set at "0" while a second address generator would have its Add_B input always set at "1".

Figure 6:
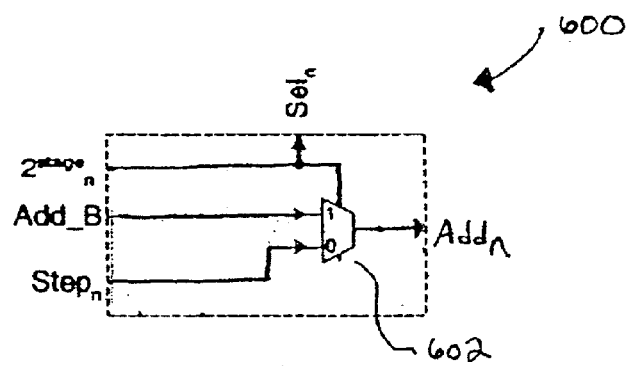
FIG. 6 is a block diagram depicting a bit cell in accordance with the present invention.

FIG. 6 is a block diagram depicting an alternative embodiment of a bit cell used in an apparatus for generating addresses in accordance with the present invention. Bit cell 600 consists of a simplified version of bit cell 200 shown in FIG. 2. With bit cell 600, the inputs S$_{n-1}$ and Sel$_{n-1}$ are eliminated, and the two multiplexers and the OR gate are replaced with a single multiplexer 602. Multiplexer 602 receives input select signal $2^{stage}_n$ and inputs Add_B and Step$_n$. Input select signal $2^{stage}_n$ represents one bit of the decoded value of the computation stage. Add_B is the address insertion bit, while Step$_n$ represents one current bit of the computation step value. Bit cell 600 provides as outputs Add$_n$ and Sel$_n$. Add$_n$ is the address bit generated by bit cell 600. Sel$_n$ is coupled to signal $2^{stage}_n$ and is provided to another consecutive bit cell.

Figure 7:
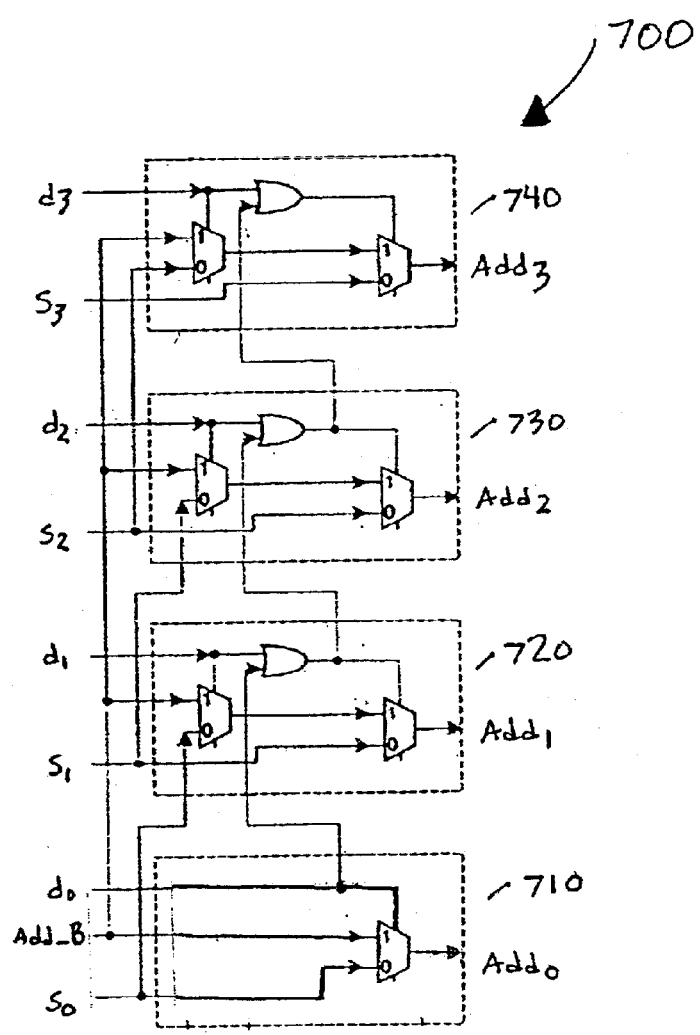
FIG. 7 is a block diagram depicting details of an address generator in accordance with the present invention utilizing the bit cell of FIG. 6.

FIG. 7 is a block diagram depicting an address generator 700 in accordance with the present invention using the bit cell 600 of FIG. 6 as its first consecutive bit cell 710. Bit cell 710 consists of a simplified version of bit cell 510 of address generator 500 when the S$_{n-1}$ and Sel$_{n-1}$ inputs are both "0" as depicted in FIG. 4. Address generator 700 operates in the same manner as address generator 500.

Figure 8:
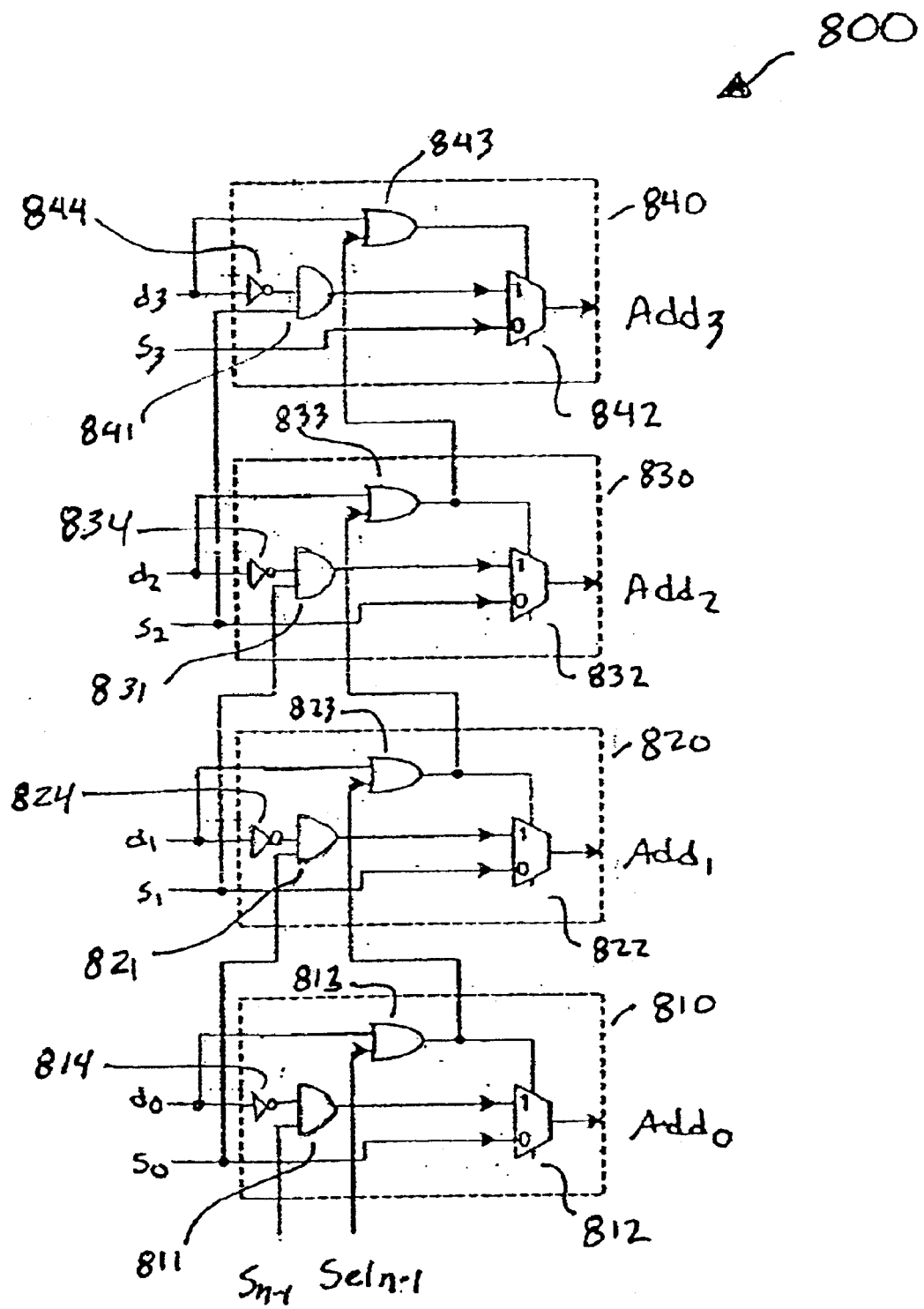
FIG. 8 is a block diagram depicting details of an address generator in accordance with the present invention.
Figure 9:
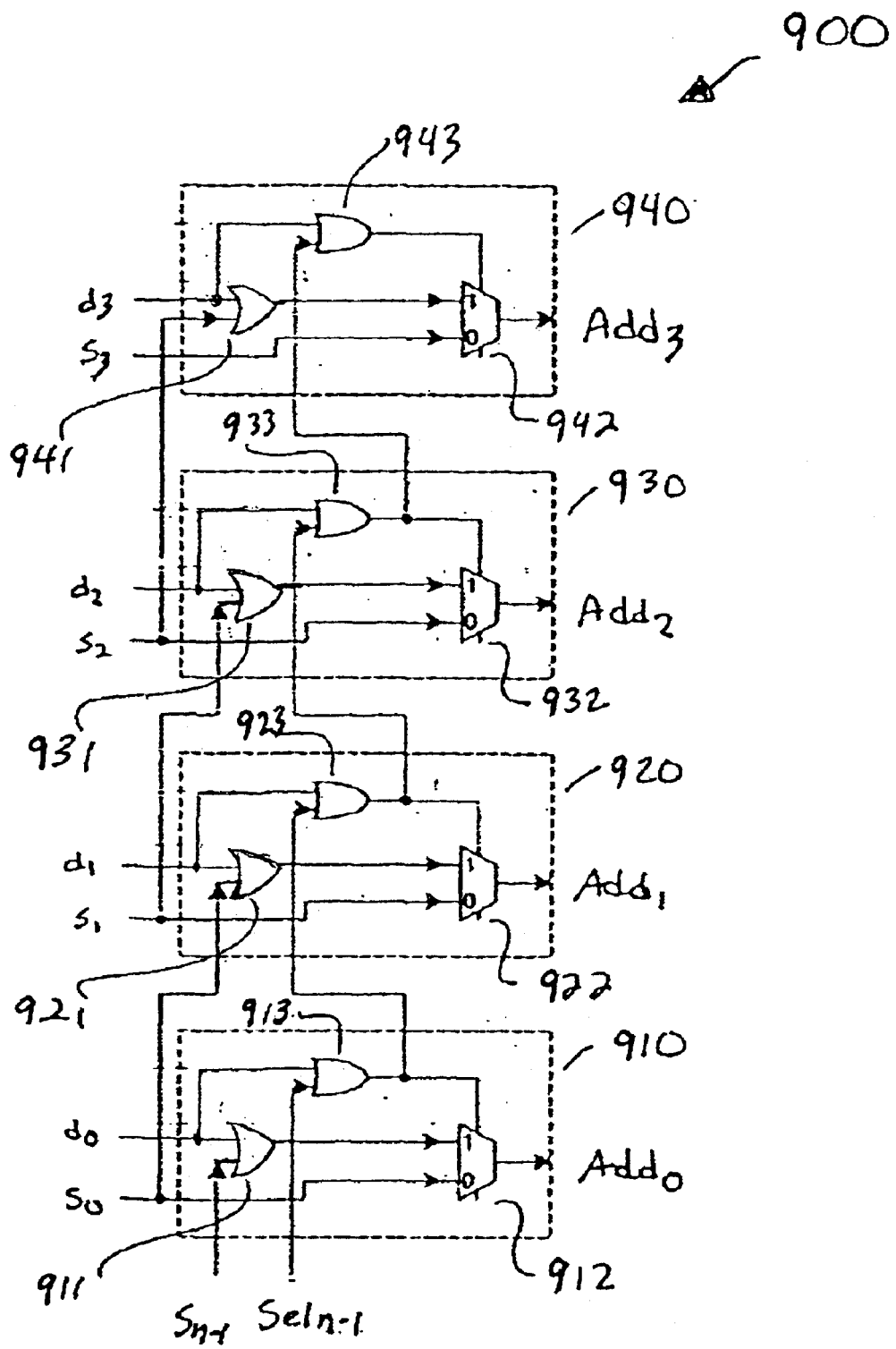
FIG. 9 is a block diagram depicting details of an address generator in accordance with the present invention.

Alternative embodiments of address generator 500 can operate to generate only the "A" data address or only the "B" data address. Thus, as shown in FIG. 1, two address generators can work in parallel to simultaneously generate both "A" and "B" addresses, With such a configuration, a first address generator would have its Add_B input always set at "0" while a second address generator would have its Add_B input always set at "1". As such, a simplification can be made to the address generator 500. As shown in FIG. 8, if the Add_B input of address generator 500 is always set at "0", the first multiplexer of the bit cell 300 shown in FIG. 3 can be replaced with an AND gate having as inputs Step$_n$ and the inversion of $2^{stage}$. Likewise, as shown in FIG. 9, if the Add_B input of address generator 500 is always set at "1", the first multiplexer of the bit cell 300 shown in FIG. 3 can be replaced with an OR gate having as inputs Step$_n$ and $2^{stage}$. The operation of these alternative embodiments shown in FIGS. 8 and 9 will now be discussed.

FIG. 8 is a block diagram depicting an address generator 800 in accordance with the present invention. Address generator 800 is similar to address generator 500, but is configured only to produce an "A" data address by inserting a logical "0" between existing bits of a computation step value at a bit insertion position.

As an illustration, the operation of address generator 800 will be discussed in the context of generating the "A"

address for stage$_1$, step$_6$. Each bit cell 810–840 produces an output bit with a value equal to the Step$_n$ bit, the Step$_{n-1}$ bit, or the insertion bit (in this case a logical "0"), based upon the decoded value of the stage. The decoded value of the stage is determined b representing $2^{stage}$ in binary form. As such, for stage$_1$, the decoded value of the stage is represented as 0010 (d$_3$ d$_2$ d$_1$ d$_0$). Step$_6$ is represented in binary form as 0110 (S$_3$ S$_2$ S$_1$ S$_0$).

With reference to bit cell 810, AND gate 811 receives as inputs bit Step$_{n-1}$(S$_{n-1}$) and the inverted value of the bit corresponding to the decoded stage value (d$_0$). For stage$_1$, bit d$_0$ equals "0". In this example, bit s$_{n-1}$ is set at "0" for bit cell 810. Thus, AND gate 811 provides as an output a logical "0". Multiplexer 812 of bit cell 810 receives as inputs the output of AND gate 811 and bit Step$_n$(s$_0$). The output of OR gate 813 is supplied as the input select line for multiplexer 812. OR gate 813 receives as inputs bit d$_0$ and bit Sel$_{n-1}$. In this example, bit Sel$_{n-1}$ is set at "0" for bit cell 810. Thus, OR gate 813 provides "0" as an output, and multiplexer 812 selects s$_0$ as an output. Accordingly, bit cell 810 provides s$_0$ (a logical "0") as its output address bit Add$_0$.

With reference to bit cell 820, AND gate 821 receives as inputs bit Step$_{n-1}$(s$_{n-1}$) and the inverted value of the bit corresponding to the decoded stage value (d$_1$). Bit d$_1$ equals "1" for stage$_1$. Thus, AND gate 821 provides as an output a logical "0". Multiplexer 822 receives as inputs the output of AND gate 821 and bit Step$_n$ (s$_1$). The output of OR gate 823 is supplied as the input select line for multiplexer 822: OR gate 823 receives as inputs bit d$_1$ and bit Sel$_{n-1}$. Bit Sel$_{n-1}$ is the output of OR gate 813 from bit cell 810, which in this example equals "0". Therefore, OR gate 823 provides "1" as an output, and multiplexer 822 selects the output of AND gate 821 as its output Add$_1$ (a logical "0"). In this manner, a bit with a value equal to the insertion bit "0" is inserted into the output word of address generator 800.

With reference to bit cell 830, AND gate 831 receives as inputs bit Step$_{n-1}$(s$_{n-1}$) and the inverted value of the bit corresponding to the decoded stage value (d$_2$). For stage$_1$, bit d$_2$ equals "0". Thus, AND gate 831 provides a logical "1" as its output. Multiplexer 832 of bit cell 830 receives as inputs the output of AND gate 831 and bit Step$_n$ (S$_2$). The output of OR gate 833 is supplied as the input select line for multiplexer 832. OR gate 833 receives bit d$_2$ and bit Sel$_{n-1}$ as inputs. Bit Sel$_{n-1}$ is the output of OR gate 823 from the bit cell 420, which in this case equals "1". Thus, OR gate 833 provides "1" as an output, and multiplexer 832 selects the output of AND gate 831 as its output Add$_2$ (a logical "1"). In this manner, bit cell 830 provides as its output a bit equal to the value of the previously skipped bit s$_1$.

Lastly, with reference to bit cell 840, AND gate 841 receives as inputs bit Step$_{n-1}$(s$_{n-1}$) and the inverted value of the bit corresponding to the decoded stage value (d$_3$). Bit d$_3$ equals "0" for stage$_1$. Thus, AND gate 841 provides as an output a logical "1". Multiplexer 842 receives as inputs the output of AND gate 841 and bit Step$_n$(s$_3$). The output of OR gate 843 is supplied as the input select line for multiplexer 842. OR gate 843 receives as inputs bit d$_3$ and bit Sel$_{n-1}$. Bit Sel$_{n-1}$ is the output of OR gate 833 from bit cell 830, which in this case equals "1". Thus, OR gate 843 provides "1" as an output, and multiplexer 842 selects the output of AND gate 841 as its output Add$_3$ (a logical "1"). In this manner, bit cell 840 provides as its output a bit equal to the value of the previously skipped bit s$_2$.

As can be seen from the above description, address generator 800 produces an output address word 1100 for stage$_1$, step$_6$. The output word 1100 comprises the input word step$_6$ (0110) with a "0" inserted at the s$_1$ bit position and the left-most bits (s$_2$, S$_3$) shifted to the left.

FIG. 9 is a block diagram depicting an address generator 900 in accordance with the present invention. Address generator 900 operates in a manner similar to that of address generator 800, but is configured only to produce an "B" data address by inserting a logical "1" between existing bits of a computation step value at a bit insertion position. For example, for stage$_1$, step$_6$ address generator 900 produces an output address word 1110. The output word 1110 comprises the input word step$_6$ (0110) with a "1" inserted at the s$_1$ bit position and the left-most bits (S$_2$, s$_3$) shifted to the left.

Figure 10:
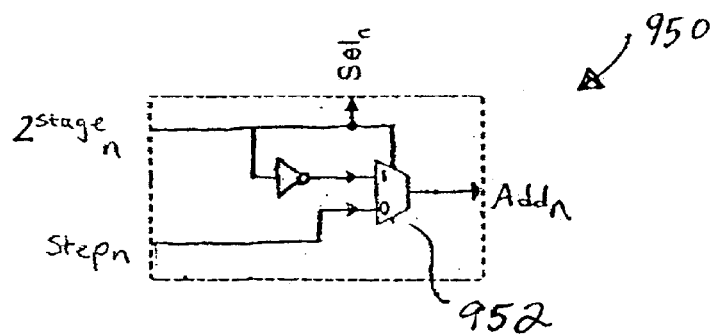
FIG. 10 is a block diagram depicting a bit cell in accordance with the present invention.

FIG. 10 is a block diagram depicting one embodiment of the bit cell 950 used in an apparatus for generating addresses in accordance with the present invention. Bit cell 950 consists of a simplified version of bit cells 810–840 shown in FIG. 8. With bit cell 950, the AND gate, the OR gate, and the inputs S$_{n-1}$ and Sel$_{n-1}$ are eliminated. Multiplexer 952 receives as inputs Step$_n$ and the inverted value of $2^{stage}{}_n$. Multiplexer 952 receives $2^{stage}{}_n$ as its input select signal. Signal $2^{stage}{}_n$ represents one bit of the decoded value of the computation stage, while Step$_n$ represents one current bit of the computation step value. Bit cell 950 provides as outputs Add$_n$ and Sel$_n$. Add$_n$ is the address bit generated by bit cell 950. Sel$_n$ is coupled to signal $2^{stage}{}_n$ and is provided to another consecutive bit cell.

Figure 11:
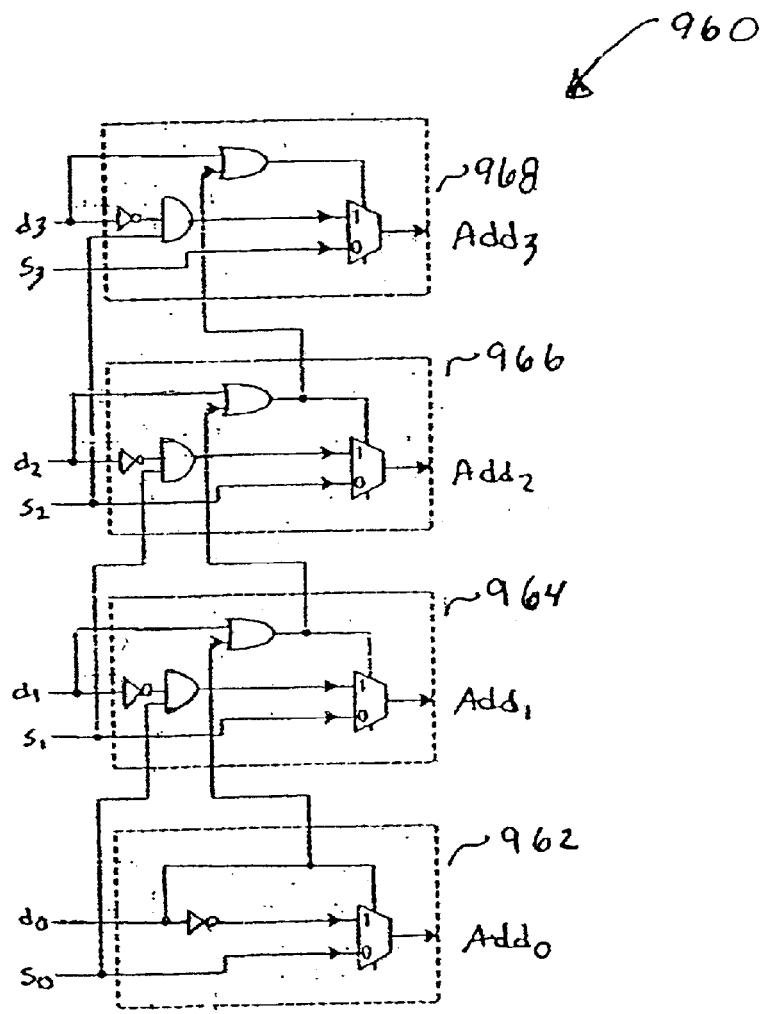
FIG. 11 is a block diagram depicting details of an address generator in accordance with the present invention utilizing the bit cell of FIG. 10.

FIG. 11 is a block diagram depicting an address generator 960 in accordance with the present invention using the bit cell of FIG. 10 as its first consecutive bit cell 962. Bit cell 962 consists of a simplified version of bit cell 810 of address generator 800. Address generator 960 operates in the same manner as address generator 800.

Figure 12:
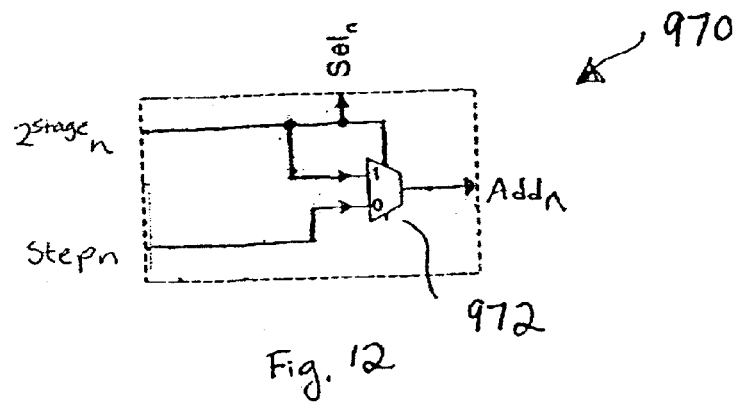
FIG. 12 is a block diagram depicting a bit cell in accordance with the present invention.

FIG. 12 is a block diagram depicting one embodiment of the bit cell 970 used in an apparatus for generating addresses in accordance with the present invention. Bit cell 970 consists of a simplified version of bit cells 910–940 shown in FIG. 9. With bit cell 970, the two OR gates and the inputs S$_{n-1}$ and Sel$_{n-1}$ are eliminated. Multiplexer 952 receives as inputs Step$_n$ and $2^{stage}{}_n$. Multiplexer 972 also receives $2^{stage}{}_1$ as its input select signal. Signal $2^{stage}{}_n$ represents one bit of the decoded value of the computation stage, while Step$_n$ represents one current bit of the computation step value. Bit cell 970 provides as outputs Add$_n$ and Sel$_n$. Add$_n$ is the address bit generated by bit cell 970. Sel$_n$ is coupled to signal $2^{stage}{}_n$ and is provided to another consecutive bit cell.

Figure 13:
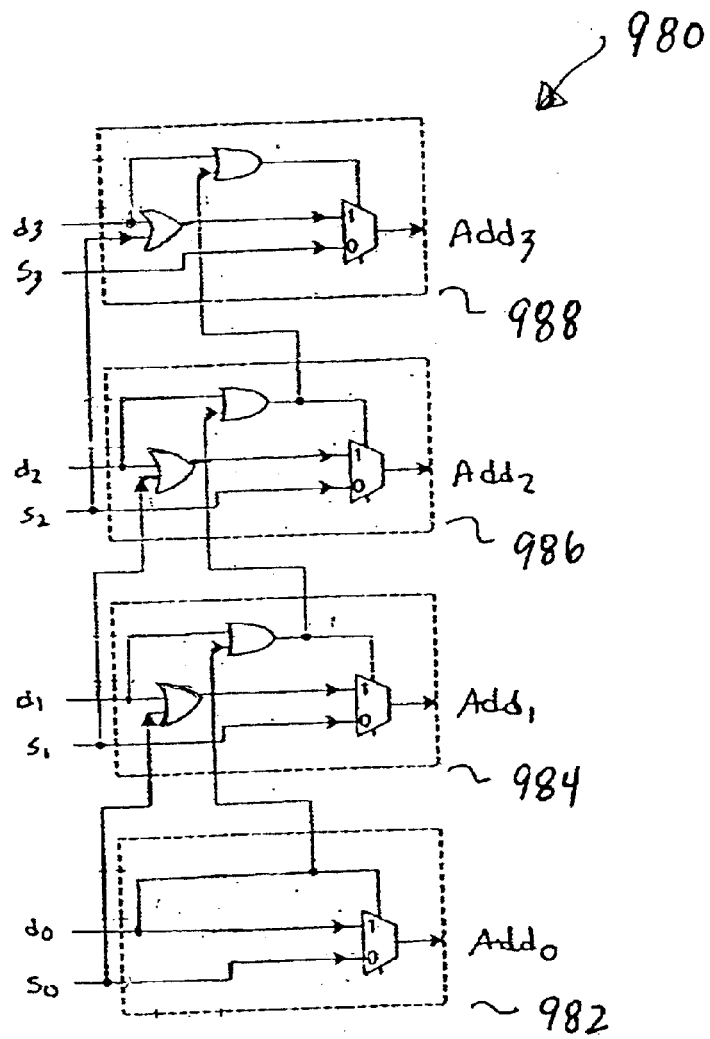
FIG. 13 is a block diagram depicting details of an address generator in accordance with the present invention utilizing the bit cell of FIG. 12.

FIG. 13 is a block diagram depicting an address generator 980 in accordance with the present invention using the bit cell of FIG. 12 as its first consecutive bit cell 982. Bit cell 982 consists of a simplified version of bit cell 910 of address generator 900. Address generator 980 operates in the same manner as address generator 900.

The foregoing detailed description of die invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating a sequence of FFT data addresses for an FFT circuit for operation on a P-point signal, wherein the operation includes n computation stages and m computation steps per computation stage, comprising:
in a first computation stage:
providing a computation stage value;
providing a computation step value;
generating a first pair of data addresses in parallel by inserting a logical "1" at a bit insertion position in one copy of a binary word and a logical "0" at the same bit insertion position in another copy of the binary word, wherein the computation stage value determines the bit insertion position and the computation step value determines the binary word;
providing additional computation step values and generating additional pairs of data addresses in parallel by inserting a logical "1" at the bit insertion position in one copy of a binary word and a logical "0" at the same bit insertion position in another copy of the binary word, wherein the bit insertion position is unchanged but each binary word is determined by an additional computation step value; and
repeating the above steps for additional computation stages, wherein the bit insertion position is determined by an additional computation stage value.

2. The method according to claim 1, wherein providing a computation stage value includes decoding a computation stage value by computing $2^{stage}$ to provide a decoded computation stage value.

3. The method according to claim 1, wherein providing a computation stage value includes generating the computation stage value by a programmable counter and decoding the computation stage value by computing $2^{stage}$ to provide a decoded computation stage value.

4. The method according to claim 1, wherein providing a computation step value includes generating the computation step value by a programmable counter.

5. The method according to claim 1, including passing the pair of addresses to a dual-ported data memory.

6. An address generator for an FFT comprising:
consecutive bit cells comprising:
a first multiplexer operable to receive as inputs a current step bit from a previous consecutive bit cell and a first insertion bit, and operable to receive as a select input a corresponding stage value bit;
a first logic gate operable to receive as inputs the corresponding stage value bit, a bit from a previous consecutive bit cell, wherein an output of the first logic gate is coupled to a next consecutive bit cell; and
a second multiplexer operable to receive as inputs a corresponding current step bit and an output of the first multiplexer, and operable to receive as a select input the output of the first logic gate, wherein the second multiplexer provides an output of the bit cell.

7. The address generator of claim 6, wherein the stage value bit comprises one bit of a decoded binary word representing $2^{stage}$.

8. The address generator of claim 7, wherein the binary word is generated by a programmable counter.

9. The address generator of claim 6, wherein the current step bit comprises one bit of a binary word representing a step value, and wherein the binary word is generated by a programmable counter.

10. The address generator of claim 6, wherein the first logic gate comprises an OR gate.

11. The address generator of claim 6, wherein a first of the consecutive bit cells comprises:
a third multiplexer operable to receive as inputs the corresponding current step bit and the first insertion bit, and operable to receive as a select input the corresponding stage value bit, wherein the third multiplexer provides an output of the bit cell.

12. The address generator of claim 6, further comprising:
a second set of consecutive bit cells comprising:
a third multiplexer operable to receive as inputs a current step bit from a previous consecutive bit cell and a second insertion bit, and operable to receive as a select input the corresponding stage value bit;
a second logic gate operable to receive as inputs the corresponding stage value bit, a bit from a previous consecutive bit cell, wherein an output of the second logic gate is coupled to a next consecutive bit cell; and
a fourth multiplexer operable to receive as inputs the corresponding current step bit and an output of the third multiplexer, and operable to receive as a select input the output of the second logic gate, wherein the fourth multiplexer provides an output of the bit cell;
and wherein the first insertion bit equals a logical "1" and the second insertion bit equals a logical "0".

13. The address generator of claim 12, wherein the second logic gate comprises an OR gate.

14. The address generator of claim 12, wherein the stage value bit comprises one bit of a decoded binary word representing $2^{stage}$.

15. The address generator of claim 14, wherein the binary word is generated by a programmable counter.

16. The address generator of claim 12, wherein the current step bit comprises one bit of a binary word representing a step value, and wherein the binary word is generated by a programmable counter.

17. The address generator of claim 12, wherein a first of the second set of consecutive bit cells comprises:
a fifth multiplexer operable to receive as inputs the corresponding current step bit and the second insertion bit, and operable to receive as a select input the corresponding stage value bit, wherein the fifth multiplexer provides an output of the bit cell.

18. An address generator for an FFT comprising:
consecutive bit cells comprising:
a first logic gate operable to receive as inputs a current step bit from a previous consecutive bit cell and a corresponding stage value bit;
a second logic gate operable to receive as inputs the corresponding stage value bit, a bit from a previous consecutive bit cell, wherein an output of the second logic gate is coupled to a next consecutive bit cell; and
a first multiplexer operable to receive as inputs a corresponding current step bit and an output of the first logic gate, and operable to receive as a select input the output of the second logic gate, wherein the first multiplexer provides an output of the bit cell.

19. The address generator of claim 18, wherein the stage value bit comprises one bit of a decoded binary word representing $2^{stage}$.

20. The address generator of claim 19, wherein the binary word is generated by a programmable counter.

21. The address generator of claim 18, wherein the current step bit comprises one bit of a binary word representing a step value, and wherein the binary word is generated by a programmable counter.

22. The address generator of claim 18, wherein the first logic gate and the second logic gate comprise an OR gate.

23. The address generator of claim 22, wherein a first of the consecutive bit cells comprises:

a second multiplexer operable to receive as inputs the corresponding current step bit and the corresponding stage value bit, and operable to receive as a select input the corresponding stage value bit, wherein the second multiplexer provides an output of the bit cell.

24. The address generator of claim 18, wherein the first logic gate comprises an AND gate that receives the corresponding stage value bit through an inverted input, and the second logic gate comprises a first OR gate.

25. The address generator of claim 24, wherein a first of the consecutive bit cells comprises:
a second multiplexer operable to receive as inputs the corresponding current step bit and an inverted value of the corresponding stage value bit and operable to receive as a select input the corresponding stage value bit, wherein the second multiplexer provides an output of the bit cell.

26. The address generator of claim 24, further comprising:
a second set of consecutive bit cells comprising:
a second OR gate operable to receive as inputs a current step bit from a previous consecutive bit cell and the corresponding stage value bit;
a third OR gate operable to receive as inputs the corresponding stage value bit, a bit from a previous consecutive bit cell, wherein an output of the third OR gate is coupled to a next consecutive bit cell; and
a second multiplexer operable to receive as inputs the corresponding current step bit and an output of the second OR gate, and operable to receive as a select input the output of the third OR gate, wherein the second multiplexer provides an output of the bit cell.

27. The address generator of claim 26, wherein the stage value bit comprises one bit of a decoded binary word representing $2^{stage}$.

28. The address generator of claim 27, wherein the binary word is generated by a programmable counter.

29. The address generator of claim 26, wherein the current step bit comprises one bit of a binary word representing a step value, and wherein the binary word is generated by a programmable counter.

30. An address generator for generating pairs of FFT data addresses, comprising:
a first generator comprising a first set of consecutive bit cells, wherein each consecutive bit cell is operable to receive as inputs a corresponding current step bit, a current step bit from a previous consecutive bit cell, a first insertion bit with a value of logical "1", and a corresponding stage value bit;
and wherein each consecutive bit cell comprises:
a means for providing an output bit with a value equal to one of the corresponding current step bit, the current step bit from a previous consecutive bit cell, and the first insertion bit based upon the corresponding stage value bit; and
a second generator comprising a second set of consecutive bit cells, wherein each consecutive bit cell is operable to receive as inputs a corresponding current step bit, a current step bit from a previous consecutive bit cell, a second insertion bit with a value of logical "0", and a corresponding stage value bit;
and wherein each consecutive bit cell comprises:
a means for providing an output bit with a value equal to one of the corresponding current step bit, the current step bit from a previous consecutive bit cell, and the second insertion bit based upon the corresponding stage value bit.

31. The address generator of claim 30, wherein the stage value bit comprises one bit of a decoded binary word representing $2^{stage}$.

32. The address generator of claim 31, wherein the binary word is generated by a programmable counter.

33. The address generator of claim 30, wherein the current step bit comprises one bit of a binary word representing a step value, and wherein the binary word is generated by a programmable counter.

* * * * *

UNITED STATES PATENT AND TRADEMARK OFFICE
CERTIFICATE OF CORRECTION

| | | |
|---|---|---|
| PATENT NO. | : 6,907,439 B1 | Page 1 of 1 |
| APPLICATION NO. | : 10/106509 | |
| DATED | : June 14, 2005 | |
| INVENTOR(S) | : David J. Wicker | |

It is certified that error appears in the above-identified patent and that said Letters Patent is hereby corrected as shown below:

Front page, first column: "This patent is subject to a terminal disclaimer." should be deleted.

Signed and Sealed this

Eighteenth Day of September, 2007

JON W. DUDAS
*Director of the United States Patent and Trademark Office*